Patented Oct. 21, 1947

2,429,211

UNITED STATES PATENT OFFICE 2,429,211

HIGH-TEMPERATURE CEMENT MODIFIER

Ralph Verne Andes, South Charleston, W. Va., and Norman Charles Ludwig, Chicago, Ill.

No Drawing. Application February 7, 1944, Serial No. 521,428

6 Claims. (Cl. 106—92)

This invention relates generally to a modifier for cements such as Portland or hydraulic cements, and relates more particularly to a starch modifier which is particularly adapted for use in connection with cement slurries employed in the oil fields, especially in connection with relatively high temperatures in excess of normal atmospheric temperature and approaching 220° F. or a higher temperature.

One aspect of the problem involved in providing a suitable well slurry which may be forced in the oil wells under high pressure behind the oil well casings or to plug back the bottom water, or for other purposes, is that the temperatures which are likely to be encountered at various depths below the earth's surface may be variable.

Before entering into a specific and detailed consideration of the invention, some further general observations may be made with reference to the sinking of the oil wells and the use of the cement slurry in connection therewith. In pumping the slurry cement in oil well operations, temperature and time are two factors which must be considered in connection with the property of mobility or pumpability of the cement.

Heretofore, cement modifiers in the form of gums and dextrines have been used; however such modifiers, while they may be used to control to some extent the stiffening time or limit of mobility of the slurry mixture, were ineffective to control the viscosity of the slurry during the early stages, that is, below the point of 3 units of viscosity, so that in many instances slurries modified by such ingredients or compounds as were found in the prior art became unpumpable within practical limits regardless of the amounts of prior art modifiers used in the slurry.

In order that a modifier for oil well cement slurries will function efficiently, it must be, as stated above, adapted to control the viscosity of the slurry during its early stages so as to maintain said viscosity below 3 units; the modifier must also control the stiffening time or limit of mobility; it must also permit rapid setting of the cement slurry when it has reached its final point of use, and the product must also be one that can be graded and adjusted so as to permit varying modifying effects so that it may function efficiently under particular temperatures and under particular conditions.

While considerable progress has been made in attaining an understanding of the exact reactions and mechanisms involved which cause increased viscosity and stiffening of cement slurries, there are still unknown and unpredictable factors involved, so that reliance must be placed upon empirical data and results obtained from tests of cement slurry under various actual conditions of use. However, one of the factors commonly recognized as contributing to the increased viscosity of the cement involves the initiating or starting of the mechanism of crystallization due to the combining with water or taking up of water by the various ingredients of the cement, such, for example, as crystallization of the aluminate and setting of the gelatinous calcium aluminate and tricalcium silicate. Of course, other reactions are also involved, probably some physical and some chemical, which bring about an increase in viscosity and a stiffening in the cement to such a point that it is no longer considered to be pumpable or mobile. In dealing with problems incident to the sinking of deep oil wells, the cement slurry, after being deposited or pumped into the well, is subject to relatively high pressure, sometimes varying from 2000 to 3000 pounds pressure at the surface to 7500 pounds per square inch at the bottom, in order to force the cement slurry to its proper location.

Due to the unusual conditions in dealing with cement slurries for oil wells, it is desirable to produce a cement that will satisfactorily function under the various conditions which are likely to be met, and such conditions very naturally depart from the normal type of Portland and hydraulic cement. Bearing in mind the accelerating effect of the relatively high temperatures that may be encountered and also the period of time required for mixing the cement, pumping it under pressure and the likelihood of unexpected delays, it is necessary that the modifier or retarder for the cement be such that a slurry cement may be produced which will remain at low viscosity so as to permit pumping for a period of time of from four to eight hours, and at the end of such time, it will set and become a solid mass.

One of the aspects of the problem in dealing with cement modifiers or retarders when a cement is subject to high temperatures is that the particular retarding composition or compound, while it may be effective to serve its purpose when used in sufficient or proper quantity for retarding at or about a given high temperature range, may not be satisfactory and suitable for use in the event that temperatures substantially below the high temperature range for which the cement is adjusted are encountered. In other words, a retarder, when used in an amount sufficient to retard the stiffening or increased viscosity of the cement slurries for a satisfactory period of time within a given high temperature range, may be detrimental to the cement mix when used at temperatures below the range of particular high temperatures for which the retarder was intended or designed for use.

The present retarder, which will be described more in detail, is a modified starch adapted to effect greater retardation at higher temperatures the lower is its solubility, and conversely, said starch will effect less retardation at high temperature, the greater is its solubility and greater retardation at low temperatures.

The progressively increasing retarding effect on cement slurries is determined in a testing apparatus in which the changing viscosity or fluidity is reflected in the changing resistance of the slurry to stirring, or of the changing internal friction to change of form, as indicated by a constant stirring type of consistometer or viscometer, calibrated to read in poises. With the apparatus used, a value of 100 poises represents a relative viscosity or consistency of the slurry of 10 units, which is too nearly solid to flow—which point defines the limit of mobility—a condition which indicates that the initial slurry set is imminent. In order to obtain an indication of the relative viscosities at various time periods from the beginning, when the mix is in a fluid condition with low viscosity and being readily mobile, to a condition when the relative stiffness and increased viscosity is such that the slurry mix has increased in stiffness to a point which is herein designated for purposes of comparison and convenience of reference as limit of mobility, the difference between these two extreme limits of viscosity is arbitrarily represented by 10 units, the intervening numbers between 0 and 10 represent units giving relative indication of the difference in degree of slurry viscosity between these two limits at any given time period. For practical purposes of pumpability or mobility, generally it has been found that the viscosity of the slurry should be relatively low and below that value represented by 3 units, or of a viscosity between 0 and 3 units inclusive in the scale of 10, 3 units being a preferred upper limiting viscosity to permit a ready mobility and pumpability.

Actual experience with slurries in the oil field has indicated that the slurry becomes non-pumpable at a viscosity of from 40 to 60 poises or from 4 to 6 units of viscosity. It is desirable therefore, that where the slurry is to be subjected to heat as high as 200° F. or higher, to maintain the viscosity at a uniform low viscosity as much below 3 units as is practicable throughout a possible pumping period of from 4 to 8 hours.

We have discovered a retarding composition, which composition, for convenience of reference herein, will be referred to as a modified starch having distinctive and characteristic properties by which it is differentiated from other final and intermediary degradation products of starch, including the various sugars and products included in the monosaccharoses and disaccharoses, and also from the properties of the usual commercial grade of raw starch and other compositions included in the polysaccharoses and including dextrine and the various gums, such as the amorphous substances exuded from trees. One of the outstanding characteristics rendering the modified starch retardant especially suited for use as a retarder for cement slurries which are likely to be subjected to relatively high temperatures ranging from 100° F. to 200° F. or higher, is that such modified starch composition is formed as finely divided particles which are not more than 60 to 65% soluble in water. At elevated temperatures an amount of retardant up to its limit of solubility, rapidly and sharply enters into clear water solution, forming a clear non-gelling solution, and excess being filtered out. At cold water temperatures, normal atmospheric temperatures, and at temperatures between 200 and 220° F. and higher, the modified starch (in excess of that which goes into solution at solution temperature) may be dispersed as finely divided particles in the water, and there is substantially no colloidal-like gelling or thickening effect, the modified starch forming limpid solutions, all of which distinguish from common or commercial grade raw starch when stirred or dispersed in water, at temperatures corresponding to those indicated above. The finely divided modified starch particles, when added to water at normal temperatures, produce a solution which gives the typical starch reaction and meets the identifying test by producing the blue to violet color with iodine and do not progress to orange or red color. After the treated starch-like particles have been subjected to the higher temperatures and have entered into more complete solution, they do not gel and, upon application of the usual starch-test by using free iodine as a detecting color reagent, the solutions become colored deep blue or violet.

In forming the modified starch comprising the modifier of this invention, raw starch is subjected to oxidizing or hydrolizing agents which may be effective either with or without the presence of an acid or with or without the presence of an alkali, dependent on the particular agent, the time, and the temperatures employed for the processing, which temperatures probably should be kept relatively low. The starch under the influence of the hydrogen peroxide radical $H_2O_2$ of any one of a number of well-known agents such as sodium perborate $NaBO_2.H_2O_2$ or $NaBO_2.H_2O_2.3H_2O$, or, due to the strong oxidizing action of potassium dichromate $K_2Cr_2O_7$, in the presence of water and a dilute acid, for example, water made .25 per cent normal with hydrochloric acid or ammonium persulphate either alone or in the presence of sulphuric acid or other per-acids, for example, peracetic acid, so that hydrolysis and/or oxidation take place either substantially simultaneously or probably in succession, the end oxidation product probably following the products resulting from hydrolysis.

As illustrative of the oxidizing agents that may be employed in aqueous solutions without any acid addition, and as indicating the behavior of the resulting processed or modified starch composition as a modifier with the cement slurry, indicating the stiffening time for certain percentages and also the increase in stiffening time over the unmodified cement slurry, the following table is given (the modifier was prepared from raw corn starch as the base material):

| Agent | Processing | | Stiffening Time Tests At 180° F. | | |
|---|---|---|---|---|---|
| | Per Cent Solution | Temp. and Time of Digestion | Per Cent Modifier | Stiffening Time | Increase over Blank |
| Calcium Hypochlorite, $Ca(ClO)_2$ | 5 | 5 days at room temp. | .14 | 5:10 | 3:10 |
| Sodium Peroxide, $Na_2O_2$ | 1 | 24 hrs. at 102° F. | .10 | 4:45 | 2:45 |
| Hydrogen Peroxide, $H_2O_2$ | 1.3 | 1 hr. at 140° F. | .10 | 3:40 | 1:40 |

[1] Approximate.

It has been found that sodium perborate may be employed for processing starch by digesting the raw starch in a one per cent (1%) sodium perborate solution for twenty-five (25) hours at a temperature of 105° F.

When a starch paste is subjected to the action of a weak acid in the presence of water, it is resolved into similar carbohydrates, the reaction being the result of a break-up of the numerous anhydride groups of the complicated starch molecule with the formation of hydroxyl radicals from the water present, the acid not going into the combination but acting catalytically. This may generally be said to represent the mechanism of hydrolysis, but in the presence of oxygen or strongly oxidizing agents, other reactions occur resulting in products or compositions of different character.

The property of stability, thermally and physically, of the modified starch of this invention is employed by providing for grinding the modified starch composition with the cement clinkers, in which high temperatures are encountered. By grinding the modifying starch or retardant composition of this invention with the cement clinkers, a thorough and uniform dispersion of the retardant throughout the dry cement composition is obtained. Due to the stable characteristic of the modified starch, the above grinding operation takes place without injuriously affecting the modified starch, or in any way changing its retardant action.

One of the significant and important aspects of the modified starch retardant of this invention is that in order to produce what might be called a thermophylic-like cement slurry, only one-half (½) to one-third (⅓) of the modified starch composition is required as compared with the more expensive gums and proteins of the prior art. "Thermophylic" as used herein is used in the sense that such cement slurry will withstand relatively high temperatures when treated, so as to maintain relatively low viscosity for relatively long periods, which viscosity may be varied and controlled, depending upon the degree of modification of the starch.

We prefer to employ, for most purposes, a treated retardant composition that starts to dissolve at 140° F., although we also contemplate using other compositions resulting from the processing of the raw starch ingredients that dissolve at lower temperatures, the essential point being that the starch composition exerts its most effective and full retarding action on cement slurry only above some minimum temperature which corresponds roughly with the point at which it starts to dissolve, as it exerts but very little retarding effect below that temperature. This latter characteristic and property of being substantially without effect in retarding the slurry at the lower temperatures is one distinguishing the present modified starch composition from other compositions which have been employed in the prior art for retarding at normal temperatures, and also certain other retardants for cement slurries subjected to relatively high temperatures.

The cold water solubility of the modified starch is the criteria for the degree of modification of the starch under the methods of modification set forth herein. We have found that starches of different cold water solubility, that is, solubility in water 80° F., effect retardation of cement slurries in varying degrees at different temperatures, as clearly set forth in the following typical table:

*Time required for cement slurry to reach "Limit of mobility"*

| Per cent Retarder per 100 parts cement | Cold water solubility | 100° F. hr.—min. | 140° F. hr.—min. | 180° F. hr.—min. | 200° F. hr.—min. | 220° F. hr.—min. |
|---|---|---|---|---|---|---|
| 0 | | 6:20 | 3:00 | 2:15 | 2:00 | 1:45 |
| .15–.20% | Up to 10% | 6:45 | 3:15 | 6:30 | 6:00 | 3:30 |
| .12–.15% | 10–25% | 8:00 | 7:00 | 7:30 | 5:45 | 2:50 |
| .10–.12% | 25–40% | 9:45 | 10:15 | 8:30 | 5:30 | 2:20 |
| .08–.10% | 40–65% [1] | 16:00 | 10:27 | 7:00 | 5:15 | 2:00 |

[1] Viscosities undesirably high.

Up to 10% solubility: Starch has little effect at temperatures less than 160° F., above which, marked retarding is noted.

10–25% solubility: Starch has appreciable retarding effect at all temperatures.

25–40% solubility: Starch has marked retarding effect at temperatures from 100 to 180° F.

40–65% solubility: Starch and starches of higher solubility provide undesirably high slurry viscosity and it will be noted, provide over-retarding for some purposes at 100 to 140° F., and insufficient retarding at from 180° to 220° F.

Those skilled in the art to which this invention pertains will readily appreciate from the study of the above table and from the disclosures heretofore set forth that materially smaller amounts of the modified starch retardant are necessary as compared with prior art retardants, even though giving enhanced qualities.

One of the foremost features of the modified retardant of this invention is its ability to control slurry viscosity during the period of pumpability or mobility. As will be readily appreciated, modified starch having various degrees of solubility may be produced and the advantages taken of such degrees of solubility, and the proper grade of starch may be selected to give the amount of retarding action required.

The following table illustrates clearly how the units of viscosity of a slurry will vary with the solubility characteristic of the modified starch:

*Control of slurry viscosity during period of mobility—Consistometer tests at 200° F.*

| Solubility | Slurry viscosity in unit of 10 poises | | | | | | Time to reach "Limit of mobility" |
|---|---|---|---|---|---|---|---|
| | 30 min. | 1 hr. | 2 hrs. | 3 hrs. | 4 hrs. | 5 hrs. | |
| Up to 10% | .80 | .80 | 1.20 | 1.50 | 1.80 | 2.20 | 6 hrs. |
| 10–25% | .90 | 1.30 | 1.90 | 2.10 | 2.20 | 2.80 | 5 hrs., 45 min. |
| 25–40% | 1.20 | 1.80 | 2.10 | 2.20 | 2.40 | 3.00 | 5 hrs., 30 min. |
| 40–65% | 2.00 | 2.60 | 2.90 | [1]3.00 | 3.20 | 4.80 | 5 hrs., 15 min. |

[1] Undesirably high in units of viscosity.

Having thus described our invention, what we claim is:

1. A modified Portland cement for oil well and similar uses comprising a mixture of Portland cement and a modified starch in the proportions of less than .50% starch to 100 parts cement, said starch being of a class selected from the group consisting of oxidized starches and hydrolyzed starches, the said modified starch having a solubility in water at approximately 80° F. in effective amounts up to 65%, which is substantially non-gelling when added to water and cement water mixtures at atmospheric temperatures and forming a solution in water which responds to the iodine test to show a blue to violet color and not orange or red, said starch effecting greater retardation at higher temperatures the lower is its solubility, and conversely said starch effecting less retardation at high temperature the greater is its solubility and greater retardation at low temperatures.

2. A modified Portland cement for oil well and similar uses comprising a mixture of Portland cement and a modified starch in the proportions of less than .50% starch to 100 parts cement, said starch being of a class selected from the group consisting of oxidized starches and hydrolyzed starches, the said modified starch having a solubility in water at approximately 80° F. in effective amounts up to 65%, which is substantially non-gelling when added to water and cement water mixtures at atmospheric temperatures and forms a solution in water which responds to the iodine test when suspended in water to show a blue to violet color and not orange or red, said starch effecting greater retardation at higher temperatures the lower is its solubility, and conversely said starch effecting less retardation at high temperature the greater is its solubility and greater retardation at low temperatures, said starch being uniformly dispersed throughout the mixture.

3. A slurry for oil well use adapted to remain pumpable or mobile for extended periods of time and comprising a mixture of water and Portland cement, the said cement including a modifying composition consisting of a modified starch of a class selected from the group consisting of oxidized starches and hydrolyzed starches, the said modified starch having an effective solubility in water at approximately 80° F. up to approximately 65 per cent solubility, which is substantially non-gelling when added to water and cement water mixtures at atmospheric temperatures, and forming a solution in water which responds to the iodine test for starch to show a blue to violet color and not orange or red, the said modified starch being present in effective proportions but less than .50% starch to 100 parts of the Portland cement.

4. A Portland cement containing a cement modifying composition, which consists essentially of a modified starch selected from the group consisting of oxidized starches and hydrolyzed starches, the said modified starch having an effective solubility in water up to approximately 65 per cent at approximately 80° F., which is substantially non-gelling when added to water and cement water mixtures at atmospheric temperatures, and when added to water, forms a solution which responds to the iodine test for starch to show a blue to violet color and not orange or red; the said modifying composition being uniformly dispersed throughout the resulting product, and being present in effective proportions but less than .50% of the modifying composition to 100 parts of the cement.

5. A Portland cement containing a cement-modifying composition, which consists essentially of a modified starch selected from the group consisting of oxidized starches and hydrolyzed starches, the said modified starch having an effective solubility in water not over approximately 65 per cent at approximately 80° F., which is substantially non-gelling when added to water and cement water mixtures at atmospheric temperatures, and which forms a solution in water that responds to the iodine test for starch to show a blue to violet color and not orange or red, the said modified starch being present in effective proportions but less than .50% to 100 parts of the cement.

6. A Portland cement containing a cement-modifying composition, which consists essentially of a modified starch of a class selected from the group consisting of oxidized starches and hydrolyzed starches, the said modified starch having a solubility in water at approximately 80° F., but not more than approximately 65 per cent, which modified starch is substantially non-gelling when added to water and cement water mixtures at atmospheric temperatures and which, when added to water, forms a solution which responds to the iodine test for starch to show a blue to violet color and not orange or red, the said modified starch effecting greater retardation at higher temperatures, the lower is its solubility, and conversely, the said starch effecting less retardation at high temperatures the greater its solubility and greater retardation at low temperatures, the said modifying composition being uniformly dispersed throughout the resulting product and being present in effective proportions but less than .50% to 100 parts of cement.

RALPH VERNE ANDES.
NORMAN CHARLES LUDWIG.

REFERENCES CITED

The following references are of record in the file of this patent:

UNITED STATES PATENTS

| Number | Name | Date |
|---|---|---|
| 2,006,426 | Weiler | July 2, 1935 |
| 2,211,368 | Dickens | Aug. 13, 1940 |
| 2,234,191 | Olze | Mar. 11, 1941 |
| 2,374,628 | Swazze | Apr. 24, 1945 |

FOREIGN PATENTS

| Number | Country | Date |
|---|---|---|
| 391,711 | France | 1908 |

OTHER REFERENCES

Radley Manufacturing Chemist and Manufacturing Perfumer, July 1942, XIII, 7, page 161.